(No Model.)

A. B. CARTER.
WHEEL AND AXLE COUPLING.

No. 324,654.   Patented Aug. 18, 1885.

Witnesses
B. J. Noyes.
W. H. Sigston.

Inventor
Alba B. Carter.
by Crosby & Gregory
Att'ys.

UNITED STATES PATENT OFFICE.

ALBA BRIGGS CARTER, OF GREAT FALLS, NEW HAMPSHIRE, ASSIGNOR TO THE EUREKA AXLE COMPANY, OF PORTLAND, MAINE.

WHEEL-AND-AXLE COUPLING.

SPECIFICATION forming part of Letters Patent No. 324,654, dated August 18, 1885.

Application filed October 23, 1884. (No model.)

*To all whom it may concern:*

Be it known that I, ALBA BRIGGS CARTER, of Great Falls, county of Strafford, State of New Hampshire, have invented an improvement in Wheel-and-Axle Couplings, of which the following description, in connection with the accompanying drawings, is a specification, like letters on the drawings representing like parts.

My invention relates to a device for fastening a wheel upon an axle, and is intended as an improvement on a wheel-and-axle coupling of the class shown in Letters Patent No. 301,478, granted to me July 8, 1884. In the said patent the arm or bearing portion of the axle is provided with a circumferential groove, and the box or sleeve of the wheel-hub is provided with a ball, a portion of which enters the said groove, while the opposite portion of the said ball is seated in a cup-shaped recess at the end of a screw in the hub. In the said patent the screw is provided with a device for turning it, and also for locking the screw or preventing it from being turned after it has been properly adjusted.

In another application filed herewith I have shown a wheel-and-axle coupling in which the axle is grooved and the hub provided with an engaging device seated in a screw having a novel locking device, and in the present application the invention consists, essentially, in the combination, with the grooved axle and engaging device, of an adjusting and holding screw for the said engaging device connected therewith, and a locking device co-operating with the said screw.

The axle-engaging device may be constructed in various different ways, it being adapted to rotate freely around a radial axis, so as to produce but little friction against either side of the groove in the axle.

Figure 1:
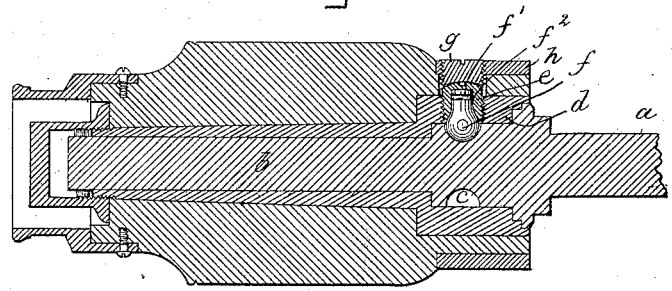
Figure 2:
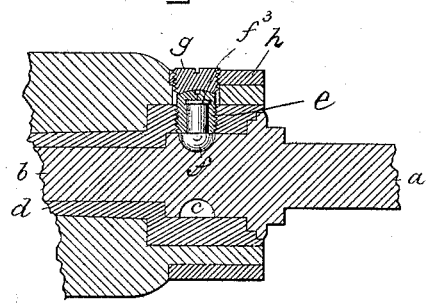
Figure 3:
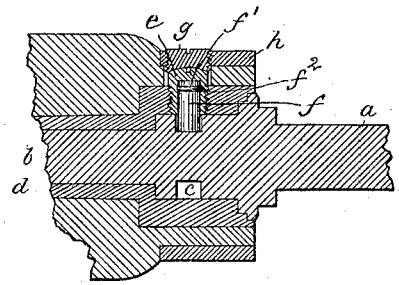
Figure 4:
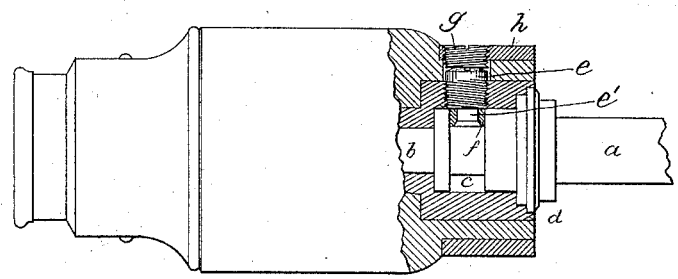

Figure 1 is a longitudinal section of a portion of an axle and hub connected therewith by a coupling device embodying this invention, and Figs. 2, 3, and 4 sectional details illustrating different forms of engaging devices.

The axle $a$, having its arm or bearing portion $b$ provided with a circumferential groove, $c$, may be substantially as in my former patent, referred to.

The box or bearing-sleeve $d$ is provided with a threaded passage containing a screw, $e$, provided with an engaging device, $f$, to enter the groove $c$ in the axle, the said engaging device being loosely connected with the said screw, so as to rotate freely around the axis thereof, thus producing but little friction against the sides of the groove $c$.

As shown in Figs. 1, 2, 3, the engaging device $f$ has a neck or shank entering a passage or socket in the screw $e$, and, as shown in Figs. 1 and 3, the said shank is provided with a groove, $f'$, engaged by a pin, $f^2$, inserted through the screw $e$, and thus retaining the engaging device in the screw while permitting it to rotate freely therein.

As shown in Fig. 2, the shank of the engaging device is provided with a flange or collar, $f^3$, engaging a corresponding groove in the screw $e$, which is shown as split longitudinally to receive the flanged shank within it.

In Fig. 4 the screw $e$ is provided with a projection, $e'$, upon which the engaging device $f$, made as a pulley or roller, is free to rotate, and the said shank $e'$ is slightly headed or upset to retain the said engaging device thereon. The screw $e$ may be turned radially outward sufficiently far to withdraw the engaging device from the groove $c$, when the hub may be slipped off from the axle as required, for the purpose of cleaning or lubricating the same.

When the wheel is to be connected with the axle, it is slipped into position thereon, and the screw $e$ turned inward until the engaging device $f$ comes to a bearing in the groove $c$, its engagement in the said groove being properly adjusted by turning the screw a little one way or the other until the engaging device just touches without pressure. When thus adjusted, the screw $e$ is prevented from further movement by a locking-screw, $g$, preferably having a thread of opposite inclination, or right-handed when the screw $e$ is left-hand threaded, the said screw $g$ being turned so as to press forcibly on the screw $e$, and thus prevent further movement of the said screw. As shown, in this instance the screw $g$ is contained in the band $h$, surrounding the hub, and the screw $e$ may be inserted in its threaded passage from the inside of the hub before the latter is applied to the wheel.

When desired to remove the wheel or to adjust the engaging device $f$ with relation to the groove, the screw $g$ is first removed, affording access to the screw $e$, which may then be turned as desired.

As shown in Figs. 1 and 2, the groove $c$ in the axle is rounded or curved in cross-section, and in Figs. 3 and 4, the groove $c$ is square in cross-section, the engaging device being correspondingly shaped.

The present invention is not limited to the particular form of locking device shown for the screw holding the axle-engaging device, as the said screw, with the loosely-connected rotary axle-engaging device, may be provided with a locking device such as shown in my former patent, or with others that will be readily suggested to those familiar with mechanical construction.

It is not essential to the invention that the axle-engaging device should be attached to the screw, as one feature of the invention consists in the combination of the grooved axle and the holding-screw in the hub with an axle-engaging device adapted to enter the groove and having a fixed axis of rotation in the said screw, thus differing from the ball shown in my former patent, which was free to rotate about any axis.

I claim—

1. The combination of the axle having a circumferential groove with the hub provided with a screw and engaging device loosely connected therewith and capable of rotating, the engaging device being placed within or removed from the groove of the axle by turning the said screw, substantially as described.

2. The combination of the axle having a circumferential groove with the hub provided with a screw and engaging device loosely connected therewith, adapted to be placed within or removed from the groove of the axle by turning the said screw, and a locking-screw provided with a thread of opposite hand or inclination, substantially as described.

3. The grooved axle and hub combined with an engaging device to enter the said groove, a holding-screw for the engaging device, and locking device for the said screw, the engaging device being retained in connection with its holding-screw and having a free rotary movement in the groove, substantially as described.

4. The combination of the axle having a circumferential groove with the hub provided with a screw, and engaging device loosely connected therewith, adapted to be placed within or removed from the groove of the axle by turning the said screw, and a locking device co-operating with the said screw, substantially as described.

5. The combination of the axle having a circumferential groove with the hub, provided with a socketed screw, and an axle-engaging device having a shank entering and free to rotate in the said screw, substantially as described.

In testimony whereof I have signed my name to this specification in the presence of two subscribing witnesses.

ALBA BRIGGS CARTER.

Witnesses:
CHARLES H. FAUNCE,
JACOB B. STEVENS.